(12) United States Patent
Root et al.

(10) Patent No.: US 7,537,188 B2
(45) Date of Patent: May 26, 2009

(54) ADJUSTING DEVICE

(75) Inventors: Paul Root, Bad Endbach (DE); Markus Neuhof, Ehringshausen-Niederlemp (DE); Matthias Müller, Dillenburg (DE); Stefan Körner, Eschenburg (DE)

(73) Assignee: Rittal GmbH & Co. KG, Herborn (DE)

( * ) Notice: Subject to any disclaimer, the term of this patent is extended or adjusted under 35 U.S.C. 154(b) by 194 days.

(21) Appl. No.: 11/582,523

(22) Filed: Oct. 17, 2006

(65) Prior Publication Data
US 2007/0095994 A1    May 3, 2007

(30) Foreign Application Priority Data
Oct. 17, 2005 (DE) .................. 10 2005 049 874

(51) Int. Cl.
*A47F 1/10* (2006.01)
*E04G 3/00* (2006.01)
(52) U.S. Cl. ............................. 248/295.11; 248/285.1; 248/280.11; 361/681
(58) Field of Classification Search ........... 248/295.11, 248/285.1, 282.1, 284.1, 280.11, 279.1, 631; 361/681
See application file for complete search history.

(56) References Cited

U.S. PATENT DOCUMENTS

| 3,399,856 | A | 9/1968 | Pecaut | |
| 6,286,794 | B1* | 9/2001 | Harbin | 248/123.2 |
| 6,783,105 | B2* | 8/2004 | Oddsen, Jr. | 248/279.1 |
| 6,857,610 | B1* | 2/2005 | Conner et al. | 248/284.1 |
| 7,063,296 | B2* | 6/2006 | Williams | 248/285.1 |

FOREIGN PATENT DOCUMENTS

| DE | G 88 08 828.6 | 7/1988 |
| EP | 1 312 852 | 11/2002 |

* cited by examiner

*Primary Examiner*—Anita M King
(74) *Attorney, Agent, or Firm*—Pauley Petersen & Erickson

(57) ABSTRACT

An adjusting device for fastening an operating and/or display device on a wall, having a linear guide arrangement formed by a sliding element and a fastening element, wherein the sliding element has an attachment point for the operating and/or display device. A secure support of the operating/display element results if the fastening element or the sliding element has a pivotable seating arrangement or hinge, with a pivot axis oriented parallel with respect to the displacement direction of the linear guide arrangement. The fastening element can be supported on the wall on two supporting points, which are spaced apart in the displacement direction of the linear guide arrangement.

20 Claims, 4 Drawing Sheets

ADJUSTING DEVICE

BACKGROUND OF THE INVENTION

1. Field of the Invention

This invention relates to an adjusting device for fastening an operating device and/or a display device on a wall, having a linear guide arrangement formed by a sliding element and a fastening element, wherein the sliding element has an attachment point for the operating device and/or the display device.

2. Discussion of Related Art

Known adjusting devices are mostly used for fastening an operating or display device on a wall of a machine housing. Support arm systems are used for this purpose, which are screwed to the wall by a connecting wall-element. The connecting wall-element has a support arm, on whose end remote from the wall a hinge is maintained. A section of a support arm is in turn connected to the hinge. This support arm section is vertically oriented and can be pivoted around its center longitudinal axis by the hinge.

The support arm section has a slit guidance device, in which a sliding element can be linearly displaced in the vertical direction. The operating/display device is connected to the sliding element. This adjusting device has an elaborate structure.

Also, such adjusting devices cannot be installed on machine housings which absorb movements in the wall area during their operation, in particular as a result of vibrations, jarring or acceleration of machine components, such as can be the case, for example, with injection-molding machinery. These movements are transmitted to the support arm system. Because of the insufficient rigidity, the large masses being moved and the great distance of the operating/display device from the wall, damages occur, so that a dependable operational use is not assured.

SUMMARY OF THE INVENTION

It is one object of this invention to provide an adjusting device of the type mentioned above but which has great rigidity and is insensitive to vibrations or movements of the fastening surface.

This object is achieved with a fastening element or a sliding element having a pivotable seating arrangement or hinge, whose pivot axis is oriented parallel with respect to the displacement direction of the linear guide arrangement. The fastening element can be supported on the wall on two supporting points, which are spaced apart in the displacement direction of the linear guide arrangement.

With this arrangement it is possible to omit an elaborate support system. A fixation of the adjusting device in place on the machine housing is provided directly by the fastening element. During this a secure fixation in place is possible by the spaced-apart support points. Due to the fact that both the linear guide arrangement and the pivoted seating arrangement are integrated into the combination including the fastening element and sliding element, a compact, space-saving construction is possible, which maintains the operating/display device tightly on the machine wall.

Thus a construction is realized, which fixes the operating/display device in place on the machine wall so that it is insensitive to movements.

In one embodiment of this invention, the fastening element can be connected to the wall directly or via the pivoted seating arrangement. These two types of fastening make possible a particularly rigid construction, because the adjusting device is limited to a few components, and the operating/display device can be maintained close against the wall.

A simple construction can be realized if the fastening element has a profiled segment which contains the linear guide arrangement extending in the longitudinal profile direction on which the sliding element is seated by guide elements. The profiled segment has one additional advantage, to achieve a large supporting distance, and thus a secure support with it. In particular, this can be achieved if the fastening element, embodied as a profiled segment, has at least one undercut groove extending in the longitudinal profile direction in the area of the fastening side on the wall, wherein the groove forms the support points for a support on a wall. The undercut groove allows a variable selection of the fastening point.

In accordance with one embodiment of this invention, the fastening element is prestressed with respect to the sliding element in the displacement direction of the linear guide arrangement by a spring element. With the spring prestressing, it is possible to compensate at least a portion of the weight of the operating/display device, so that a force-saving height adjustment is possible.

In this case, the adjusting device can be designed so that the spring element is embodied in the form of a fluid pressure damping device, preferably as a gas pressure damping device. The gas pressure damping device has one advantage that no damage would be caused to the surroundings in case of an accident, such as could be the case, for example, in connection with oil pressure damping devices because of the escaping oil.

A space-saving and structurally simple design results if the fastening element or the sliding element has a chamber in which the spring element is at least partially received.

In one embodiment of this invention, the fastening element and the sliding element are designed as extruded profiled segments and the linear guide arrangement is formed by profiled portions of the fastening and the sliding elements formed on it. This results in a low requirement for parts.

The fastening of the adjusting device on the hinge can take place either if one or several hinges are fastened on the fastening element and the hinges are coupled to fastening elements, wherein the fastening elements form the support points for fastening on the wall, or one or several hinges are fastened on the sliding element, and the hinges have fastening receivers for the operating device and/or the display device.

For enabling the operator to provide a dependable fixation in place of the operating/display device in the actuated state, a locking device can be assigned to the hinges, or at least to one of them, by which the hinge movement can be blocked.

BRIEF DESCRIPTION OF THE DRAWINGS

This invention is explained in greater detail in view of an exemplary embodiment represented in the drawings, wherein.

DETAILED DESCRIPTION OF THE INVENTION

Figure 1:
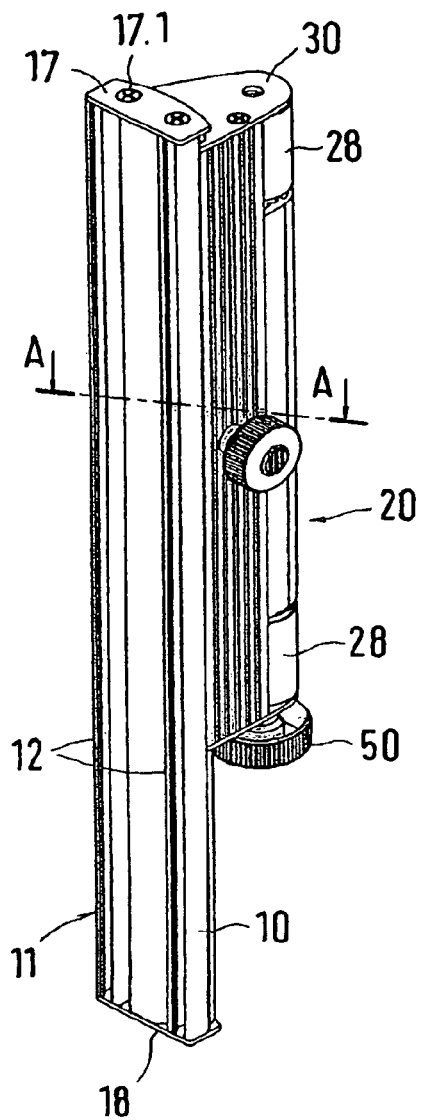
FIG. 1 shows an adjusting device in a perspective view.
Figure 3:
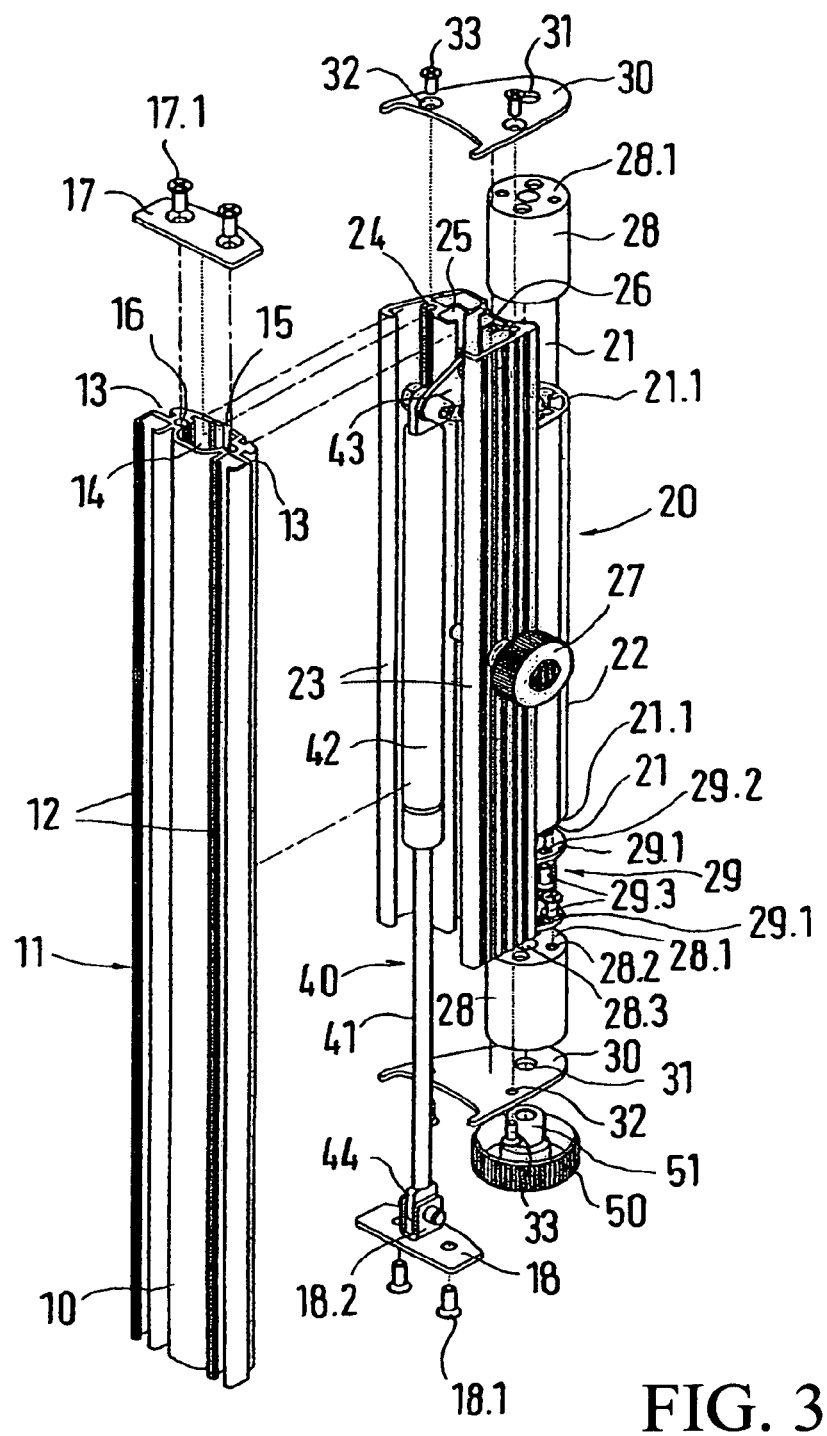
FIG. 3 shows an exploded perspective view, in accordance with the device shown in FIG. 2, from a front.
Figure 4:
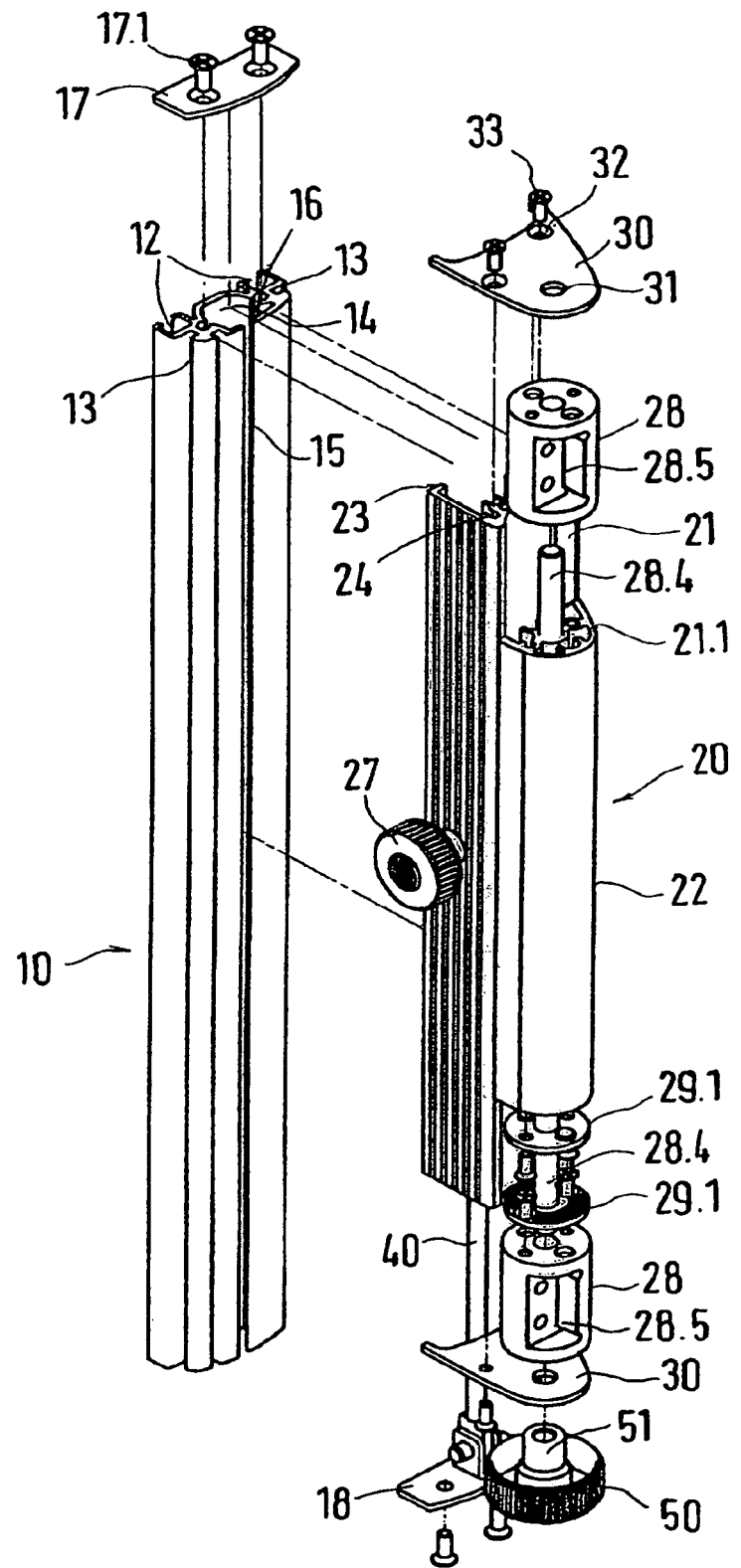
FIG. 4 shows an exploded perspective view, in accordance with a device, from a rear.

An adjusting device with a fastening element 10 and a sliding element 20 is shown in FIG. 1. A detailed representation of these two elements is shown in FIGS. 3 and 4. As FIG. 3 shows, the fastening element 10 is embodied as an extruded profiled aluminum segment and has a wall fastening side 11, which has two T-shaped grooves 12 that extend parallel with and spaced apart from each other. The grooves 12 extend in the longitudinal direction of the profiled segment and are used for receiving nuts which can be continuously variably shifted in the grooves 12. On its two facing profiled sides, the fastening element 10 has two linear guide arrangements 13, which are embodied as grooves. A chamber 14 is arranged in the area between the linear guide arrangements 13 and is open in the direction opposite the wall fastening side 11 in the form of a slit 15 extending in the longitudinal direction of the profiled segment. A spring element 40 can be inserted into the chamber 14 through the open front face of the profiled segment. The spring element 40 is embodied as a gas pressure damping device with a piston rod 41 and a cylinder 42. On its free end, the piston rod 41 is connected by a fastening elbow 44 to a cover 18. The cover 18 closes off the lower front face of the fastening element 10 and has two screw receivers, through which the fastening screws 18.1 are introduced and screwed into longitudinally oriented screw channels 16 of the fastening element 10. The piston rod 41 is fixed in place on the fastening element 10 without having to thus be mechanically prepared.

The upper front face of the fastening element 10 can be closed off by a further cover 17 which, for reducing the cost outlay for parts, has the same shape as the cover 18. The same as the cover 18, the cover 17 is screwed into the screw channels 16 by two fastening screws 17.1.

The spring element 40 is connected with its cylinder 42 to the sliding element 20 via a fastening elbow 43. The sliding element 20 is also embodied as an extruded profiled aluminum segment. On the side facing the fastening element 10, it has two guide elements 23, which face each other and extend in a strip-like manner in the longitudinal direction of the profiled segment. The guide elements 23 are inserted into the linear guide arrangements 13, so that the sliding element 20 can be linearly shifted with respect to the fastening element 10 in the vertical direction. During this, the spring element 40 creates a prestress, so that the sliding element 20 must be displaced in the direction of gravity against the spring force. The spring element 40 pushes the sliding element 20 against the cover 17, which acts as a stop.

As FIG. 3 shows, the sliding element 20 has a groove 25, which extends in the longitudinal direction of the profiled segment. The holder 43 can be screwed into a nut inserted into the groove 25. Because the nut can be continuously variably displaced in the groove 25, it is also possible to vary the adjustment range of the sliding element 20 defined by the lift of the spring element 40, for example a seated or stand-up work place.

On the side facing away from the fastening element 10, the sliding element 20 has two recesses 21, which are machined out of the profiled front faces. Cylinder-shaped hinge elements 28 can be inserted into the recesses 21. The hinge elements 28 are placed with one of the front faces 28.1 on a horizontal support face 21.1, which delimits the recess 21.

Figure 2:
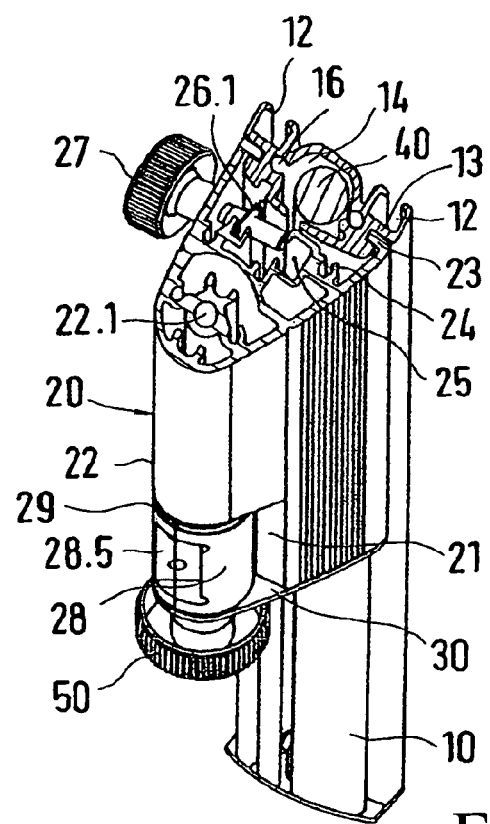
FIG. 2 is a section view taken along line II-II shown in FIG. 1.

Bearing bolts 28.4 are used for fixing the hinge elements 28 in place, and as shown in FIG. 3, are screwed into a threaded channel 22.1, as shown in FIG. 2, extending in the longitudinal direction of the profiled segment of the sliding element 20. The hinge elements 28 are pushed with a centered through-bore onto the bearing bolts 28.4. As further shown in FIG. 4, the upper hinge element 28 is secured against being vertically displaced on the bearing bolt 28.4 by a cover 30. The cover 30 has two screw receivers 32, into which fastening screws 33 are introduced. The fastening screws 33 are screwed into longitudinally oriented threaded channels 24 of the sliding element 20.

FIG. 4 shows that the lower hinge element 28 is not supported directly on the support face 21.1, but with an interspersed blocking arrangement 29. The blocking arrangement 29 has two toothed disks 29.1, which are threaded with a centered opening on the bearing bolt 28.4. The toothed disks 29.1 have a flat and a toothed side. A toothed disk 29.1 is placed with the flat side against the support face 21.1, and with the other against the front face of the hinge element 28. The toothed disks 29.1 are screwed together with the sliding element 20 or the hinge element 28, screw receivers 28.2 and 32, by fastening screws 28.4. In the assembled state, the facing teeth of the toothed disks 29.1 mesh. The lower hinge element 28 is also secured with a cover 30, but in this case it has a little axial play on the bearing bolt 28.4, so that the teeth are disengaged and the hinge element 28 is then freely rotatable. The axial displacement of the hinge element 28 can be produced by a hand wheel 50 which is in threaded connection with the bearing bolt 28.4 via a threaded element 51.

Figure 5:
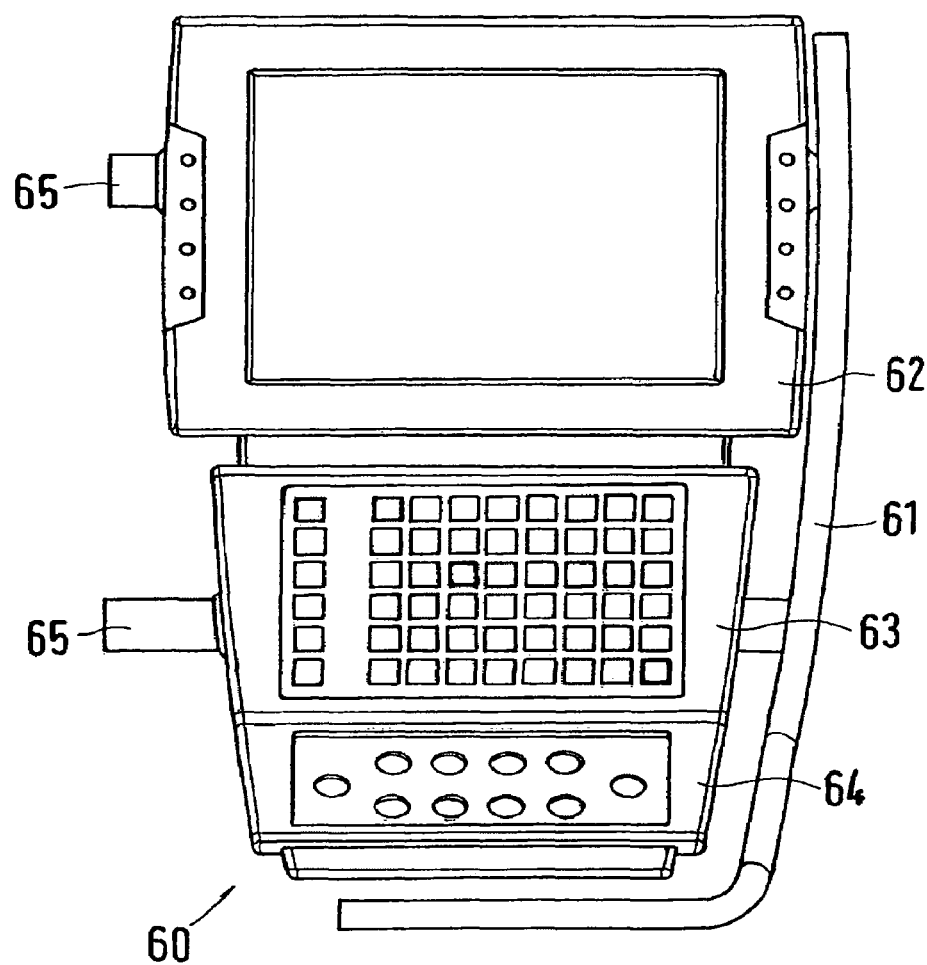
FIG. 5 shows an operating/display device, in a front view.

FIG. 5 shows an operating/display device 60 with a holding strap 61, on which a monitor 62, a keyboard 63 and a touchscreen 64 are fastened. The holding strap 61 also has two fastening pins 65 matched in cross section, as well as in their arrangement and orientation, to fastening receivers 28.5, as shown in FIG. 4, of the hinge elements 28.

The fastening pins 65 can be introduced into the fastening receivers 28.4 and screwed together with the hinge elements 28.

The connection of the adjusting device represented in the drawings to a wall, for example of a machine housing, takes place by the fastening element 10. The wall has bores, which are aligned with the grooves 12. Nuts are inserted into the grooves 12, which can be aligned with the bores. It is then possible to insert screws into the bores and to screw them into the nuts. The fastening element 10 is supported over its entire length on the wall, so that a dependable fixation is provided.

For adjusting the operating height of the operation/display element 60, the sliding element 20 can be linearly displaced with respect to the fastening element 10. Ideally, in this case the spring force of the spring element 40 compensates the weight of the operating/display element 60, so that its height adjustment can be blocked with almost no force by a handle 27 and a threaded bolt is connected, which is passed through an opening in the sliding element 20.

As FIG. 2 shows, the threaded bolt is screwed into a clamping nut 26.1 and clamps the sliding element 20 to the fastening element 10 when the handle 27 is pulled.

The setting of the angular position of the operating/display element 60 is performed by the hinge element 28 with the hand wheel loosened. The hand wheel is tightened in the desired adjusted position, and in the process the lower hinge element 28 is displaced opposite the force of gravity until the teeth of the toothed disks 29.1 mesh and are pressed against each other.

German Patent Reference 10 2005 049 874.4, the priority document corresponding to this invention, and its teachings are incorporated, by reference, into this specification.

What is claimed is:

1. An adjusting device for fastening at least one of an operating device or a display device (60) on a wall, having a linear guide arrangement (13) formed by a sliding element (20) and a fastening element (10), wherein the sliding element (20) has an attachment point for the at least one of the operating device or the display device (60), the adjusting device comprising:

one of the fastening element (10) or the sliding element (20) having a pivotable seating arrangement with a pivot axis oriented parallel with respect to a displacement direction of the linear guide arrangement (13), and the fastening element (10) supportable on the wall on two supporting points which are spaced apart in the displacement direction of the linear guide arrangement (13); and wherein the fastening element (10) is prestressed with respect to the sliding element (20) in the displacement direction of the linear guide arrangement (13) by a spring element (40).

2. The adjusting device in accordance with claim 1, wherein the fastening element (10) is connectible to the wall one of directly and via the pivotable seating arrangement.

3. The adjusting device in accordance with claim 2, wherein the fastening element (10) is a profiled segment which contains the linear guide arrangement (13) extending in a longitudinal profile direction, on which the sliding element (20) is seated by guide elements (23).

4. The adjusting device in accordance with claim 3, wherein the fastening element (10) is embodied as a profiled segment, has at least one undercut groove (12) extending in the longitudinal profile direction in the area of the fastening side on the wall, and the groove (12) forms support points for support on the wall.

5. The adjusting device in accordance with claim 4, wherein the spring element (40) has a form of a fluid pressure damping device.

6. The adjusting device in accordance with claim 5, wherein one of the fastening element (10) and the sliding element (20) has a chamber (14) in which the spring element (40) is at least partially received.

7. The adjusting device in accordance with claim 6, wherein the fastening element (10) and the sliding element (20) are extruded profiled segments and the linear guide arrangement (13) is formed by profiled portions of the fastening element (10) and the sliding element (20).

8. The adjusting device in accordance with claim 7, wherein a hinge (28) is fastened on the fastening element (10) and the hinge (28) is coupled to the fastening element, wherein the fastening element forms the support points for fastening on the wall.

9. The adjusting device in accordance with claim 7, wherein a hinge (28) is fastened on the sliding element (20), and the hinge (28) has fastening receivers (28.5) for the at least one of the operating device and the display device.

10. The adjusting device in accordance with claim 9, wherein a locking device (29) is assigned to the hinge, by which a hinge movement can be blocked.

11. The adjusting device in accordance with claim 1, wherein the fastening element (10) is a profiled segment which contains the linear guide arrangement (13) extending in a longitudinal profile direction, on which the sliding element (20) is seated by guide elements (23).

12. The adjusting device in accordance with claim 1, wherein the fastening element (10) is embodied as a profiled segment, has at least one undercut groove (12) extending in a longitudinal profile direction in the area of the fastening side on the wall, and the groove (12) forms support points for support on the wall.

13. The adjusting device in accordance with claim 1, wherein the spring element (40) has a form of a fluid pressure damping device.

14. The adjusting device in accordance with claim 1, wherein the fastening element (10) and the sliding element (20) are extruded profiled segments and the linear guide arrangement (13) is formed by profiled portions of the fastening element (10) and the sliding element (20).

15. The adjusting device in accordance with claim 14, wherein a hinge (28) is fastened on the fastening element (10) and the hinge (28) is coupled to the fastening element, wherein the fastening element forms the support points for fastening on the wall.

16. The adjusting device in accordance with claim 15, wherein the hinge (28) is fastened on the sliding element (20), and the hinge (28) has fastening receivers (28.5) for the at least one of the operating device and the display device.

17. The adjusting device in accordance with claim 16, wherein a locking device (29) is assigned to at least one hinge, by which a hinge movement can be blocked.

18. An adjusting device for fastening at least one of an operating device or a display device (60) on a wall, having a linear guide arrangement (13) formed by a sliding element (20) and a fastening element (10), wherein the sliding element (20) has an attachment point for the at least one of the operating device or the display device (60), the adjusting device comprising:

one of the fastening element (10) or the sliding element (20) having a pivotable seating arrangement with a pivot axis oriented parallel with respect to a displacement direction of the linear guide arrangement (13), and the fastening element (10) supportable on the wall on two supporting points which are spaced apart in the displacement direction of the linear guide arrangement (13); and wherein the fastening element (10) is connectible to the wall one of directly or via the pivotable seating arrangement, the fastening element (10) is a profiled segment which contains the linear guide arrangement (13) extending in a longitudinal profile direction, on which the sliding element (20) is seated by guide elements (23), and one of the fastening element (10) and the sliding element (20) has a chamber (14) in which a spring element (40) is at least partially received.

19. The adjusting device in accordance with claim 18, wherein the fastening element (10) has at least one undercut groove (12) extending in a longitudinal profile direction in the area of the fastening side on the wall, and the groove (12) forms support points for support on the wall.

20. The adjusting device in accordance with claim 18, wherein a hinge (28) is fastened on the fastening element (10) and the hinge (28) is coupled to the fastening element, wherein the fastening element forms the support points for fastening on the wall.

\* \* \* \* \*